US008572495B2

(12) United States Patent  (10) Patent No.: US 8,572,495 B2
Stillion et al.  (45) Date of Patent: *Oct. 29, 2013

(54) PROVIDING ELECTRONIC DISTRIBUTION OF FILTERED CALENDARS

(75) Inventors: Cameron D. Stillion, Redmond, WA (US); Hans J. Bjordahl, Seattle, WA (US); Brian J. Tsang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 548 days.

This patent is subject to a terminal disclaimer.

(21) Appl. No.: 11/300,729

(22) Filed: Dec. 15, 2005

(65) Prior Publication Data

US 2007/0143685 A1  Jun. 21, 2007

(51) Int. Cl.
*G06F 15/16* (2006.01)

(52) U.S. Cl.
USPC .......................................... 715/748; 715/963

(58) Field of Classification Search
USPC ......... 715/963, 771, 772, 773, 744, 745, 747, 715/821–823, 748–749, 854, 759
See application file for complete search history.

(56) References Cited

U.S. PATENT DOCUMENTS

| | | | |
|---|---|---|---|
| 5,452,447 A | 9/1995 | Nelson et al. | |
| 5,649,182 A | 7/1997 | Reitz | 395/607 |
| 5,729,734 A | 3/1998 | Parker et al. | |
| 5,940,594 A | 8/1999 | Ali et al. | |
| 6,016,478 A | 1/2000 | Zhang et al. | |
| 6,081,837 A * | 6/2000 | Stedman et al. | 709/219 |
| 6,122,661 A * | 9/2000 | Stedman et al. | 709/217 |
| 6,167,379 A | 12/2000 | Dean et al. | 705/9 |
| 6,182,151 B1 | 1/2001 | Cheng et al. | |
| 6,442,651 B2 | 8/2002 | Crow et al. | |
| 6,487,641 B1 | 11/2002 | Cusson et al. | |
| 6,505,241 B2 | 1/2003 | Pitts | |
| 6,553,413 B1 | 4/2003 | Leighton et al. | |
| 6,636,888 B1 | 10/2003 | Bookspan et al. | 709/203 |
| 6,658,427 B2 | 12/2003 | Kogut-O'Connell et al. | 707/103 Y |
| 6,678,793 B1 | 1/2004 | Doyle | |
| 6,748,502 B2 | 6/2004 | Watanabe et al. | |
| 6,807,606 B2 | 10/2004 | Copeland et al. | |
| 6,938,184 B2 | 8/2005 | Totolos, Jr. | |
| 6,948,135 B1 | 9/2005 | Ruthfield et al. | |

(Continued)

FOREIGN PATENT DOCUMENTS

EP  0 323 702 A2  7/1989
EP  1400900  3/2009

(Continued)

OTHER PUBLICATIONS

Copending U.S. Appl. No. 11/300,727, filed Dec. 15, 2005.

(Continued)

*Primary Examiner* — Steven Sax
(74) *Attorney, Agent, or Firm* — Merchant & Gould P.C.

(57) ABSTRACT

Systems and methods are disclosed for providing electronic distribution of filtered calendars. The disclosed systems and methods may include receiving control data. The control data may be configured to indicate a portion of master calendar data a user designates to transmit. Furthermore, the disclosed systems and methods may include filtering the master calendar data based on the control data to create filtered calendar data and transmitting the filtered calendar data.

12 Claims, 4 Drawing Sheets

(56) References Cited

U.S. PATENT DOCUMENTS

| | | | |
|---|---|---|---|
| 6,970,849 B1 | 11/2005 | DeMello et al. | |
| 7,120,879 B2* | 10/2006 | Gutberlet et al. | 715/853 |
| 7,162,698 B2* | 1/2007 | Huntington et al. | 715/736 |
| 7,200,801 B2 | 4/2007 | Agassi et al. | |
| 7,370,282 B2 | 5/2008 | Cary | 715/772 |
| 7,370,351 B1 | 5/2008 | Ramachandran et al. | |
| 7,552,393 B2 | 6/2009 | Hayes-Roth | 715/753 |
| 2002/0035451 A1* | 3/2002 | Rothermel | 703/1 |
| 2002/0143984 A1 | 10/2002 | Hudson | |
| 2003/0005056 A1* | 1/2003 | Yamamoto et al. | 709/205 |
| 2003/0036941 A1* | 2/2003 | Leska et al. | 705/9 |
| 2003/0065742 A1 | 4/2003 | Culp et al. | |
| 2003/0088479 A1* | 5/2003 | Wooten et al. | 705/26 |
| 2003/0126136 A1* | 7/2003 | Omoigui | 707/10 |
| 2003/0140192 A1 | 7/2003 | Thibault et al. | |
| 2003/0149606 A1* | 8/2003 | Cragun et al. | 705/8 |
| 2004/0002932 A1* | 1/2004 | Horvitz et al. | 706/46 |
| 2004/0039626 A1* | 2/2004 | Voorhees | 705/9 |
| 2004/0073615 A1* | 4/2004 | Darling | 709/206 |
| 2004/0225718 A1* | 11/2004 | Heinzel et al. | 709/206 |
| 2005/0039142 A1* | 2/2005 | Jalon et al. | 715/823 |
| 2005/0278217 A1* | 12/2005 | Adams et al. | 705/14 |
| 2006/0047560 A1* | 3/2006 | Adams et al. | 705/10 |
| 2006/0095857 A1* | 5/2006 | Torvinen | 715/764 |
| 2006/0123008 A1 | 6/2006 | Stillion et al. | |
| 2006/0167989 A1* | 7/2006 | Bashen et al. | 709/203 |
| 2006/0236269 A1 | 10/2006 | Borna | 715/963 |
| 2007/0081197 A1* | 4/2007 | Omoigui | 358/403 |
| 2007/0130221 A1* | 6/2007 | Abdo et al. | 707/203 |
| 2007/0143242 A1 | 6/2007 | Miller et al. | |
| 2007/0143684 A1 | 6/2007 | Stillion | |

FOREIGN PATENT DOCUMENTS

| | | |
|---|---|---|
| JP | 08123767 | 5/1996 |
| JP | 2001-297173 A | 10/2001 |
| JP | 2004295437 | 10/2004 |
| JP | 2005-322178 | 11/2005 |
| WO | WO 2004/027672 A1 | 4/2004 |
| WO | WO 2005/062279 A1 | 7/2005 |
| WO | WO 01/48622 | 1/2007 |
| WO | WO 2007/078597 A1 | 7/2007 |
| WO | WO 2007/078637 A1 | 7/2007 |

OTHER PUBLICATIONS

PCT International Search Report dated May 1, 2007 cited in International Application No. PCT/US2006/046915.
PCT International Search Report dated Jun. 5, 2007 cited in International Application No. PCT/US2006/047095.
Online Help for Microsoft Outlook 2003, "Microsoft Office Online: Help and How-To: Share my Calendar"; 1 pg.; http://office.microsoft.com/assistance/ hfws.aspx?AssetID=HP011111491033 &CTT=1& . . . (Last accessed Oct. 21, 2008).
Online Help for Microsoft Outlook 2003, "Microsoft Office Online: Help and How-to: Outlook folder permissions"; 1 pg.; http://office.microsoft.com/ assistance/hfws.aspx?AssetID=HP052422871033 (Last accessed Oct. 21, 2008).
U.S. Office Action dated Jun. 27, 2008 cited in U.S. Appl. No. 11/300,727.
Supplemental European Search Report issued in European Application No. EP 06839227.3 dated Mar. 24, 2010, 7 pages.
Chinese Office Action dated Jul. 24, 2009 in Application No. 200680047213.3.
Chinese Office Action dated Jul. 13, 2010 in Application No. 200680047373.8.
Chinese Second Office Action dated Apr. 21, 2011 in Application No. 200680047373.8.
U.S. Official Action dated Jan. 14, 2009 cited in U.S. Appl. No. 11/300,727.
U.S. Official Action dated Jul. 1, 2009 cited in U.S. Appl. No. 11/300,727.
U.S. Official Action dated Feb. 3, 2010 cited in U.S. Appl. No. 11/300,727.
U.S. Official Action dated Sep. 3, 2010 cited in U.S. Appl. No. 11/300,727.
U.S. Official Action dated Apr. 13, 2011 cited in U.S. Appl. No. 11/300,727.
U.S. Appl. No. 11/300,727, filed Dec. 15, 2005, Amendment and Response filed Nov. 3, 2008, 13 pgs.
U.S. Appl. No. 11/300,727, filed Dec. 15, 2005, Amendment and Response filed Apr. 10, 2009, 12 pgs.
U.S. Official Action dated Jun. 24, 2009 cited in U.S. Appl. No. 11/300,727, 8 pgs.
U.S. Appl. No. 11/300,727, filed Dec. 15, 2005, Amendment and Response filed Nov. 2, 2009, 10 pgs.
U.S. Appl. No. 11/300,727, filed Dec. 15, 2005, Amendment and Response filed Jul. 6, 2010, 12 pgs.
U.S. Appl. No. 11/300,727, Amendment and Response filed Feb. 3, 2011, 12 pgs.
Response to Chinese Office Action dated Jul. 24, 2009 in Application No. 200680047213.3 mailed Dec. 4, 2009, 16pgs.
European Search Report in EP Application 06839227.3, mailed Apr. 8, 2010, 7 pgs.
First Office Action in EP Application 06839227.3, mailed Jul. 1, 2010, 1 pg.
Response to first Office Action in EP Application 06839227.3, mailed Jan. 3, 2011, 14 pgs.
Second Office Action in EP Application 06839227.3, mailed Jun. 9, 2011, 24 pgs.
Poremsky, Diana, "Sams Teach Yourself Microsoft Office Outlook 2003 in 24 Hours", Sep. 12, 2003, pp. 370-376, retrieved online at: http://proquest.safaribooksonline.com/book/office-and-productivity-applications/0672325543/sharing-outlook-information/ch22lev1sec1.
Boyce, Jim, "Microsoft Office Outlook 2003 Inside Out", Nov. 12, 2003, pp. 518-526, retrieved online at: http://proquest.safaribooksonline.com/book/office-and-productivity-applications/0735615144/scheduling-appointments/.
Response to First Office Action in CN 2006800473738, filed Nov. 19, 2010, 12 pgs.
Response to Second Office Action in CN 2006800473738, filed Aug. 5, 2011, 4 pgs.
Anonymous, "Full Review of How to Freely Use Outlook, Schedule Management," Weekly Easy PC, vol. 4, No. 98, pp. 98-17 to 98-20, Feb. 8, 2000, 6 pgs., no English translation.
Brooks, Kelly et al., Lotus Domino 6.5.1 and Extended Products Integration Guide, first edition, IBM Corp., Oct. 2004, [sections 9.1-9.6], 35 pgs.
Chinese 3rd Office Action in Application 200680047373.8, mailed Dec. 13, 2011, 7 pgs.
Daboo, Cyrus et al., "Calendaring Extensions to WebDAV (CalDAV)," [online], Internet Draft rev. 0.8, [section 6.4.1], Sep. 30, 2005, [retrieved on Jan. 11, 2012], <URL: http://ietfreport.isoc.org/all-ids/draft-dusseault-caldav-08.txt>, 8 pgs.
Dawson, Frank et al., "iCalendar Message-Based Interoperability Protocol (iMIP)," [online], RFC 2447, [section 4.2], Nov. 1998, [retrieved on Jan. 11, 2012], <URL: http://www.ietf.org/rfc/rfc2447.txt>, 4 pgs.
DeAgostini, K.K., "Flexible Outlook—Managing Various Schedule or Information," Weekly EGPC, vol. 4, No. 98, pp. 181-184, Apr. 7, 2000, 5 pgs., no English translation.
Gortz, Manuel et al., "The Digital Call Assistant: Determine Optimal Time Slots for Calls," Proceedings of the Second International Workshop on Multimedia Interactive Protocols and Systems (MIPS 2004), Lecture Notes in Computer Science 3311, pp. 230-241, Nov. 16, 2004.
Honda, Masaichi, "ASCII Loadtest 2005," ASCII, vol. 29, No. 7, pp. 188 and 189, ASCII Corporation, Jun. 23, 2005, 3 pgs., no English translation.
Japanese Notice of Rejection in Application 2008545676, mailed Sep. 16, 2011, 8 pgs.
Kurihara, Ryou, "Let's Party with Mac," Mac Fan, vol. 13, No. 8, pp. 108-115, Mainichi Communications Inc., Aug. 2, 2005, 9 pgs., no English translation.

(56) References Cited

OTHER PUBLICATIONS

Mac People, "Overcoming iCal," vol. 8, No. 20, pp. 22-27, ASCII Corporation, Oct. 3, 2002, 7 pgs., no English translation.
Silverberg, Steve et al., "iCalendar Transport-Independent Interoperability Protocol (iTIP)," [online], RFC 2446, [section 4.1], Nov. 1998, [retrieved on Jan. 11, 2012], <URL: http://www.ietf.org/rfc/rfc2446.txt>, 9 pgs.
Tullio, Joe et al., "Augmenting Shared Personal Calendars," Proceedings of the 15th Annual ACM Symposium on User Interface Software and Technology (UIST 02), pp. 11-20, Oct. 27, 2002.
Japanese Notice of Rejection in Application 2008545703, mailed Jan. 20, 2012, 8 pgs.
Chinese Notice of Allowance in Application 200680047213.3, mailed Feb. 20, 2012, 4 pgs.
Japanese Final Rejection in Application 2008545676, mailed Mar. 23, 2012, 2 pgs.
U.S. Appl. No. 11/300,727, Notice fo Allowance mailed May 16, 2012, 15 pgs.
U.S. Appl. No. 11/300,727, Notice of Allowance filed Jun. 21, 2012, 7 pgs.
European Application No. 12005130.5, Communication dated Aug. 16, 2012, 2 pgs.
English Translation on Chinese Notice on the Fourth Office Action and English Fourth Office Action and English Translation of the recent pending claims for Application No. 200680047373.8 mailed Jul. 4, 2012 (10 pages).
Japanese Final Rejection mailed Jul. 13, 2012, in Application No. 2008-545703 (11 pages).
US Amendment filed Sep. 21, 2012, in U.S. Appl. No. 11/300,727 (3 pages).
Barish et al., "World Wide Web Caching: Trends and Techniques," Retrieved from the internet: http://oslab.snu.ac.kr/new/researchldynamic_web cache/resource/W orld_Wide_Web_Caching-trends_and_Techniques-2000.pdf, Retrieved on Oct. 4, 2005, 10 pages.
Candan et al., "Enabling dynamic content caching for database-driven web sites," Retrieved from the internet: http://portal.acm.org/citation.cfm?id=375663.375736#abstract, Retrieved on Oct. 4, 2005, 7 pages.
Chinese Final Rejection in Application No. 200680047373.8 mailed Jan. 25, 2013, 5 pgs.
Japanese Notice of Allowance mailed Nov. 13, 2012, in Application No. 2008-545676, 6 pages.
Japanese Pre-Appeal Re-Examination in Application 2008-545676, mailed Aug. 14, 2012, 2 pgs.
Japanese Written Appeal in Application 2008-545676, filed Jul. 23, 2012, 8 pgs.
Mandavi et al., "A Collaborative approach for caching dynamic data in portal applications," Retrieved from the internet: http://www.crpit.com/confpapers/CRPITV27Mandavi.pdf, Retrieved on Oct. 4, 2005, 8 pages.
PCT International Search Report and Written Opinion in International Application PCT/US2006/047094, mailed May 7, 2007, 8 pgs.
U.S. Appl. No. 11/300,727, USPTO Response mailed Sep. 28, 2012, 2 pgs.
U.S. Appl. No. 11/303,159, Advisory Action mailed Apr. 30, 2009, 3 pgs.
U.S. Appl. No. 11/303,159, Amendment and Response filed Dec. 22, 2008, 14 pgs.
U.S. Appl. No. 11/303,159, Amendment and Response filed Apr. 15, 2008, 12 pgs.
U.S. Appl. No. 11/303,159, Amendment and Response filed Apr. 21, 2009, 14 pgs.
U.S. Appl. No. 11/303,159, Amendment and Response filed Aug. 28, 2008, 10 pgs.
U.S. Appl. No. 11/303,159, Office Action mailed Jan. 15, 2008, 10 pgs.
U.S. Appl. No. 11/303,159, Office Action mailed Feb. 25, 2009, 12 pgs.
U.S. Appl. No. 11/303,159, Office Action mailed Jul. 2, 2008, 14 pgs.
U.S. Appl. No. 11/303,159, Office Action mailed Sep. 23, 2008, 11 pgs.
Yagoub et al., "Caching Strategies for Data-Intensive Web Sites," Retrieved from the internet: http://portal.acm.org/citation.cfm?id=672020&dl=ACM&coll=portal, Retrieved on Oct. 4, 2005, 16 pages.

* cited by examiner

PROVIDING ELECTRONIC DISTRIBUTION OF FILTERED CALENDARS

RELATED APPLICATION

Related U.S. patent application Ser. No. 11/300,727 (now U.S. Pat. No. 8,301,636), filed on even date herewith in the name of Stillion et al. and entitled "PROVIDING SCHEDULABLE CALENDARS ELECTRONICALLY," assigned to the assignee of the present application, is hereby incorporated by reference.

BACKGROUND

Distributing calendar and appointment information including, for example, free/busy time, scheduled meetings, public gatherings, and private parties, is problematic due to many limitations in mainstream technology. For example, calendar applications in general, and personal information managers in particular, have not been very good at distributing calendar information. With conventional systems, this problem is threefold. First, there are no official current internet standards for transporting calendar data. Second, conventional systems do not filter calendar data that is to be transmitted. For example, calendar data includes a mixture of private and non-private information, thus when transmitting calendar data, how much information conveyed needs to be controlled. Third, calendaring applications typically need a server to host shared or distributed calendar data. Accordingly, to take advantage of such features, users need to have access to a server.

Furthermore, scheduling meetings or making appointments with someone electronically has been a very difficult process using conventional systems. For example, users may give up on using conventional calendaring processes and may simply use a telephone instead to make appointments. Consequently, this problem may be twofold. First, conventional systems do not support distribution of personal calendars that can be used as schedulable entities. And second, conventional systems do not support presenting a user's calendar information in a format conducive to online scheduling.

In view of the foregoing, there is a need for methods and systems for providing electronically distributed calendars more optimally. Furthermore, there is a need for providing electronically distributed calendars including, for example, filtered calendar data.

SUMMARY

Consistent with embodiments of the present invention, systems and methods are disclosed for providing electronic distribution of filtered calendars. This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one embodiment, a method for providing electronic distribution of filtered calendars includes receiving control data. The control data may be configured to indicate a portion of master calendar data a user wishes to transmit. This method may also include filtering the master calendar data based on the control data to create filtered calendar data and transmitting the filtered calendar data.

According to another embodiment, a system for providing electronic distribution of filtered calendars may include a memory storage for maintaining a database and a processing unit coupled to the memory storage. The processing unit may be operative to receive control data. The control data may be configured to indicate a portion of master calendar data a user wishes to transmit. Moreover, the processing unit may be operative to filter the master calendar data based on the control data to create filtered calendar data and to transmit the filtered calendar data.

In accordance with yet another embodiment, a computer-readable medium which stores a set of instructions which when executed performs a method for providing electronic distribution of filtered calendars. The method executed by the set of instructions may include receiving control data. The control data may be configured to indicate a portion of master calendar data a user wishes to transmit. Moreover, the method executed by the set of instructions may include filtering the master calendar data based on the control data to create filtered calendar data and transmitting the filtered calendar data.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
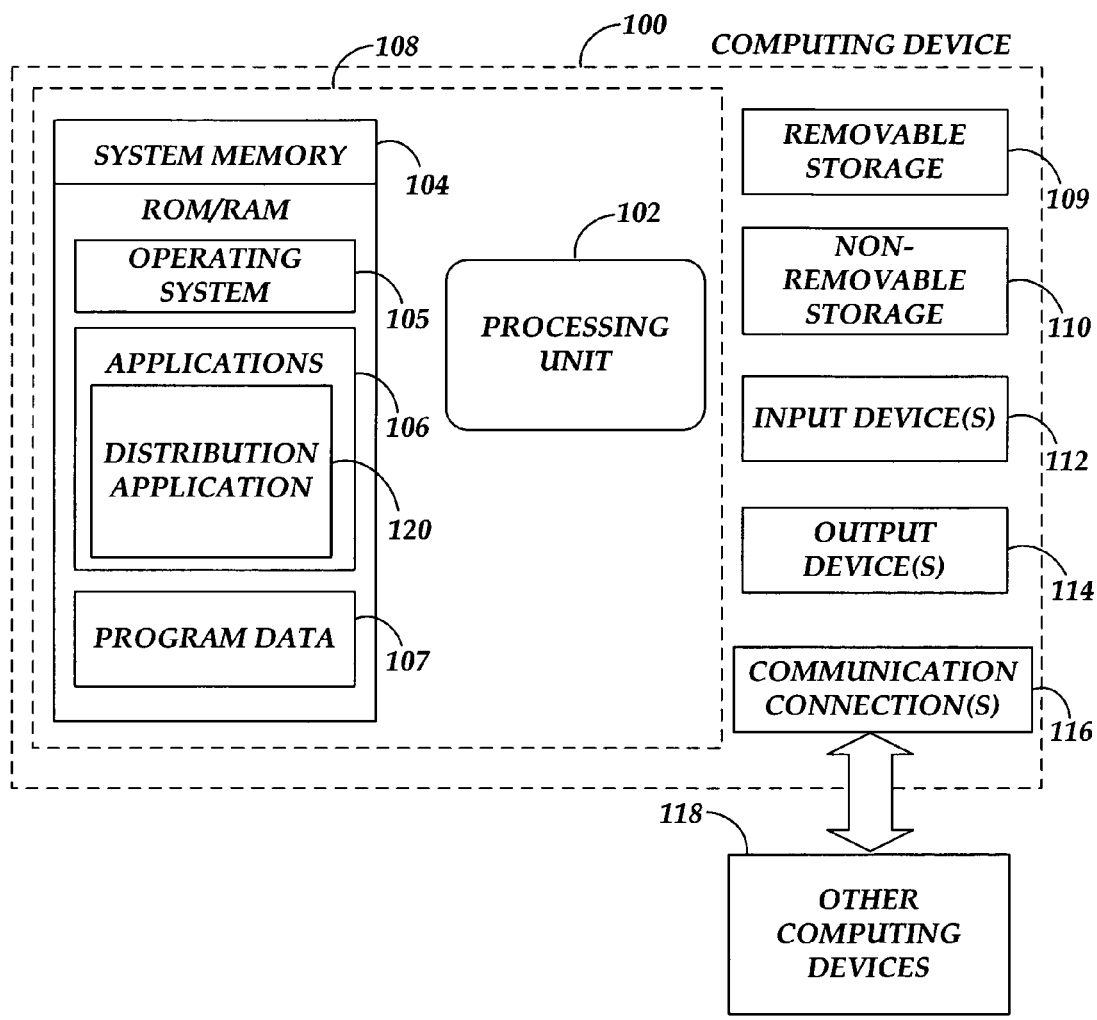
FIG. 1 is a block diagram of an exemplary system including a computing device consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding stages to the disclosed methods. Accordingly, the following detailed description does not limit the invention. Instead, the proper scope of the invention is defined by the appended claims.

Systems and methods consistent with embodiments of the present invention provide filtered calendar electronic distribution. For example, a user may wish to distribute calendar data corresponding to the user's calendar, but may wish to limit the amount of data based on the user's relationship with a recipient. For example, embodiments of the invention may include a number of user initiated controls and filters of the calendar data to be distributed. In addition, embodiments of the invention may allow a user to use e-mail features to take a calendar in a calendar application program and send it to the recipient via e-mail in a format that the recipient can use. The user can choose a subset of the user's calendar in order to limit the amount of data send based, for example, on the user's trust, comfort, or familiarity with the recipient.

Furthermore, the user may send the calendar data in at least two formats. By sending in at least two formats, the user can increase the probability that the recipient will be able to read the sent calendar data. Furthermore, one of the sent formats may be a more robust format readable by a smaller number of recipients and the other format may be a less robust format readable by a larger number of recipients. Furthermore, embodiments of the present invention may include supporting calendar distribution by an endpoint (e.g. a recipient computer) capability of such support. In other words, embodiments of the present invention may enable, for example, the recipient to process the calendar data without support from a server.

Consistent with embodiments of the present invention, a number of controls and filters over distributed calendar data may allow a user to limit the distributed calendar data by, for example, calendar time range, by those calendar appointments marked private, or by limiting the amount of content exported in each appointment that passes the filter. Furthermore, the "depth" of the distributed calendar data may be set by the user. For example, the user may set the distributed calendar data to include all fields (including attachments) or may limit the distributed calendar data to simply title, times, and body, or simply times and titles. Moreover, the user may be given further options to allow "free/busy" calendar data to be distributed that focus, for example, on empty time slots rather than filled ones in the user's calendar. Each of these filter options, for example, may include a different HTML layout to optimize space and readability for the calendar data represented.

In addition, consistent with embodiments of the present invention, a dual calendar data representation may be used. For example, the calendar data may be represented in iCalendar and/or in hypertext markup language (HTML.) The aforementioned are exemplary and other formats and more than two formats may be used. For example, iCalendar, developed by the Internet Engineering Task Force (IETF), is a pseudo-standard for a payload data format for transporting calendar items over e-mail. IETF is the protocol engineering and development arm of the Internet (IETF Secretariat c/o Corporation for National Research Initiatives 1895 Preston White Drive, Suite 100 Reston, Va. 20191-5434.) iCalendar may enable opening calendar data in a full-fledged calendar form. While calendar data in an iCal format representation is somewhat high-fidelity, it may, for example, only be accessible to users that use iCalendar enabled reader applications. Consequently, the calendar data may also be represented in an HTML version of the calendar rendered, for example, in the body of an e-mail message. While HTML may be very accessible and may be viewed by a large number of client applications that support HTML, this format is not quite as high-fidelity as iCalendar.

Furthermore, consistent with embodiments of the present invention, a calendar server may not be needed. For example, embodiments of the present invention may use true peer-to-peer (e.g. over e-mail) calendar sharing, meaning that anyone with a capable client application can use the received calendar data. For example, an iCalendar/HTML calendar "snapshot" via e-mail may be used to share calendar data consistent with embodiments of the invention.

Moreover, embodiments of the invention may include an update feature. For example, if a user sends a first calendar with a week's worth of data, and then sends a second calendar latter, embodiments of the invention may detect that these two are associated with the same calendar. Consequently, instead of opening the second calendar, embodiments of the invention may replace the old calendar data (e.g. the first calendar) with the new payload (e.g. the second calendar.)

An embodiment consistent with the invention may comprise a system for providing electronic distribution of filtered calendars. The system may comprise a memory storage for maintaining a database and a processing unit coupled to the memory storage. The processing unit may be operative to receive control data. The control data may be configured to indicate a portion of master calendar data that a user wishes to transmit. In addition, the processing unit may be operative to filter the master calendar data based on the control data to create filtered calendar data and to transmit the filtered calendar data.

Consistent with an embodiment of the present invention, the aforementioned memory, processing unit, and other components may be implemented in a computing device, such as an exemplary computing device 100 of FIG. 1. Any suitable combination of hardware, software, and/or firmware may be used to implement the memory, processing unit, or other components. By way of example, the memory, processing unit, or other components may be implemented with any of computing device 100 or any of other computing devices 118, in combination with computing device 100. The aforementioned system, device, and processors are exemplary and other systems, devices, and processors may comprise the aforementioned memory, processing unit, or other components, consistent with embodiments of the present invention.

Generally, program modules may include routines, programs, components, data structures, and other types of structures that perform particular tasks or implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

With reference to FIG. 1, one exemplary system consistent with an embodiment of the invention may include a computing device, such as computing device 100. In a basic configuration, computing device 100 may include at least one processing unit 102 and a system memory 104. Depending on the configuration and type of computing device, system memory 104 may be volatile (such as RAM), non-volatile (such as ROM, flash memory, etc.) or some combination. System memory 104 may include an operating system 105, one or more applications 106, and may include a program data 107. In one embodiment, applications 106 may include a distribution application 120. However, embodiments of the invention may be practiced in conjunction with a calendaring program, a graphics library, an operating system, or any application program and is not limited to any particular application or system. This basic configuration is illustrated in FIG. 1 by those components within a dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by a removable storage 109 and a non-removable storage 110. Computer storage media may include volatile and nonvolatile, removable and non-removable media implemented in any method or technology for storage of information, such as computer readable instructions, data structures, program modules, or other data. System memory 104, removable storage 109, and non-removable storage 110 are all examples of computer storage media. Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. The aforementioned devices are exemplary and others may be used.

Computing device 100 may also contain a communication connection 116 that may allow device 100 to communicate with other computing devices 118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein may include both storage media and communication media.

A number of program modules and data files may be stored in system memory 104 of computing device 100, including an operating system 105 suitable for controlling the operation of a networked personal computer, such as the WINDOWS operating systems from MICROSOFT CORPORATION of Redmond, Wash. System memory 104 may also store one or more program modules, such as distribution application 120, and others described below. While executing on processing unit 102, distribution application 120 may perform processes including, for example, one or more of the stages of the methods described below. The aforementioned process is exemplary, and processing unit 102 may perform other processes. Other applications 106 that may be used in accordance with embodiments of the present invention may include calendaring applications, electronic mail and contacts applications, word processing applications, spreadsheet applications, database applications, slide presentation applications, drawing or computer-aided application programs, etc.

Figure 2:
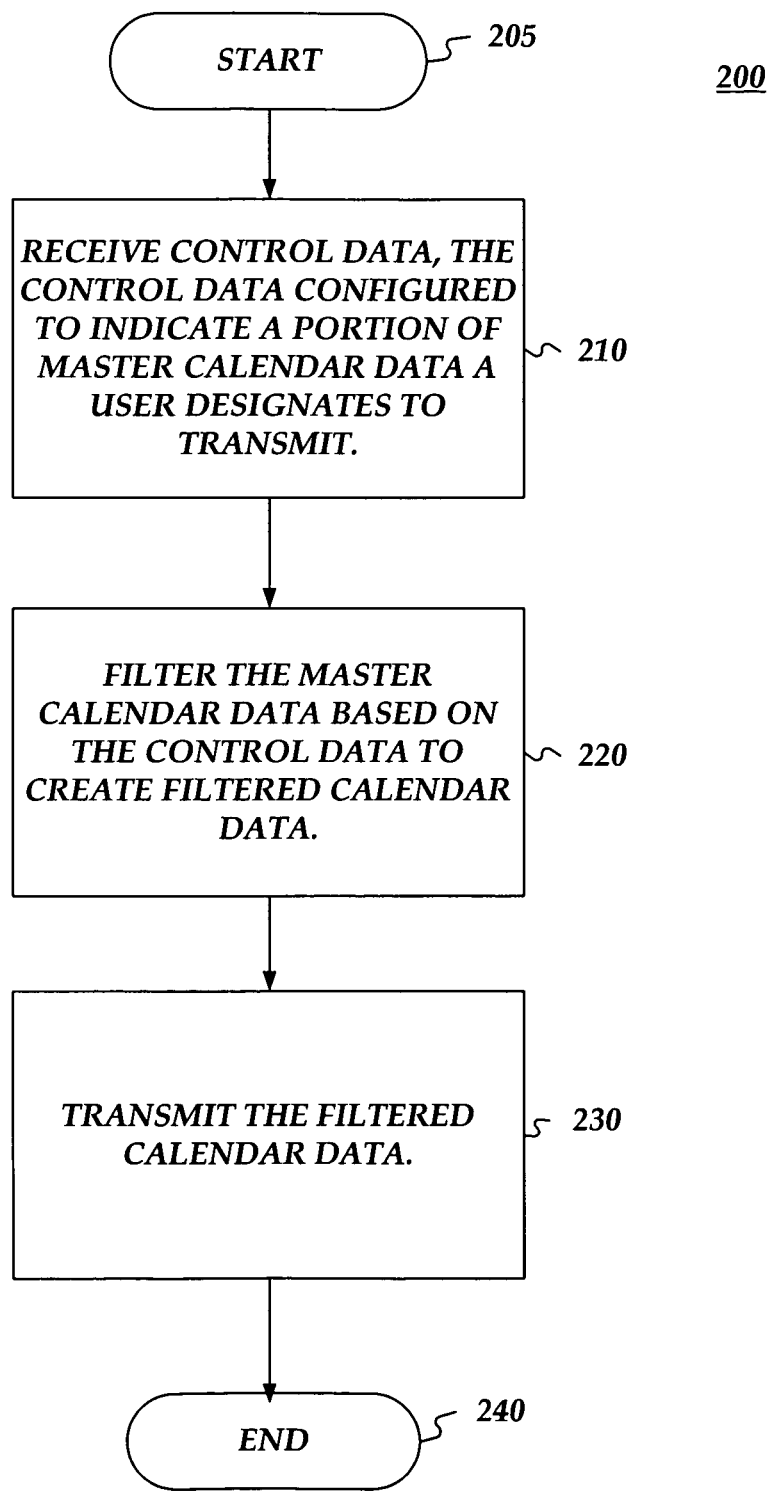
FIG. 2 is a flow chart of an exemplary method for providing electronic distribution of filtered calendars consistent with an embodiment of the present invention.
Figure 3:
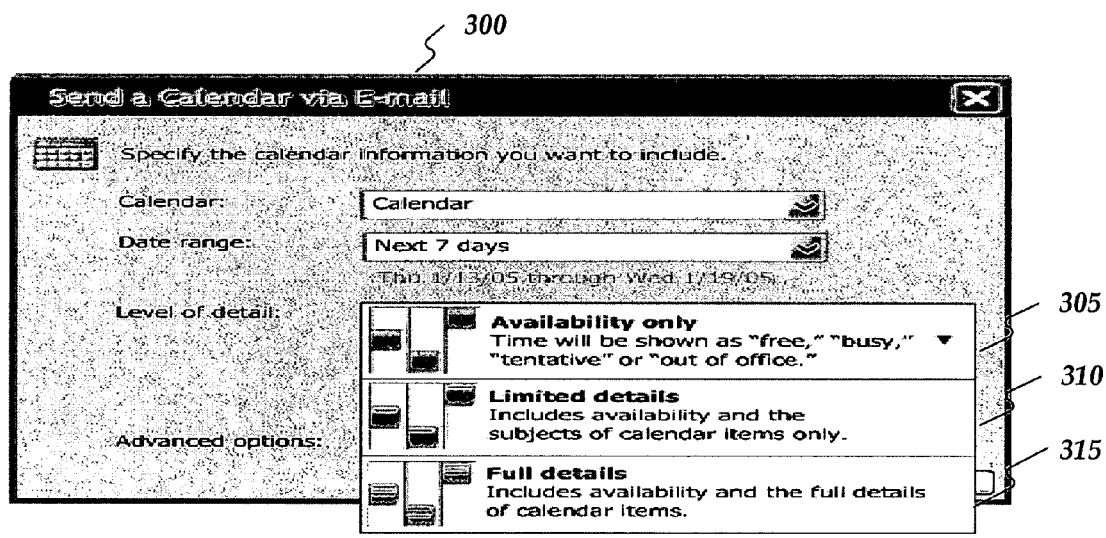
FIG. 3 is a screen shot illustrating a user interface for providing control data consistent with an embodiment of the present invention.

FIG. 2 is a flow chart setting forth the general stages involved in an exemplary method 200 consistent with the invention for providing electronic distribution of filtered calendars using system 100 of FIG. 1. Exemplary ways to implement the stages of exemplary method 200 will be described in greater detail below. Exemplary method 200 may begin at starting block 205 and proceed to stage 210 where computing device 100 may receive control data. The control data may be configured to indicate a portion of master calendar data a user designates to transmit. For example, the master calendar data may comprise the complete and unabridged calendar or calendars kept by the user on computing device 100. The user, for example, may execute a calendaring program within applications 106. Likewise, the calendaring program may initiate distribution application 120, which may expose the user to a number of user interfaces (UIs) through output devices 114 directed toward gathering the control data from the user. FIG. 3 is a screen shot 300 illustrating an exemplary UI for providing control data consistent with an embodiment of the present invention. As shown in FIG. 3, control data may indicate an availability only level 305, a limited details level 310, and a full details level 315. As described below, these and other types of control data may be provided by the user.

Figure 4:
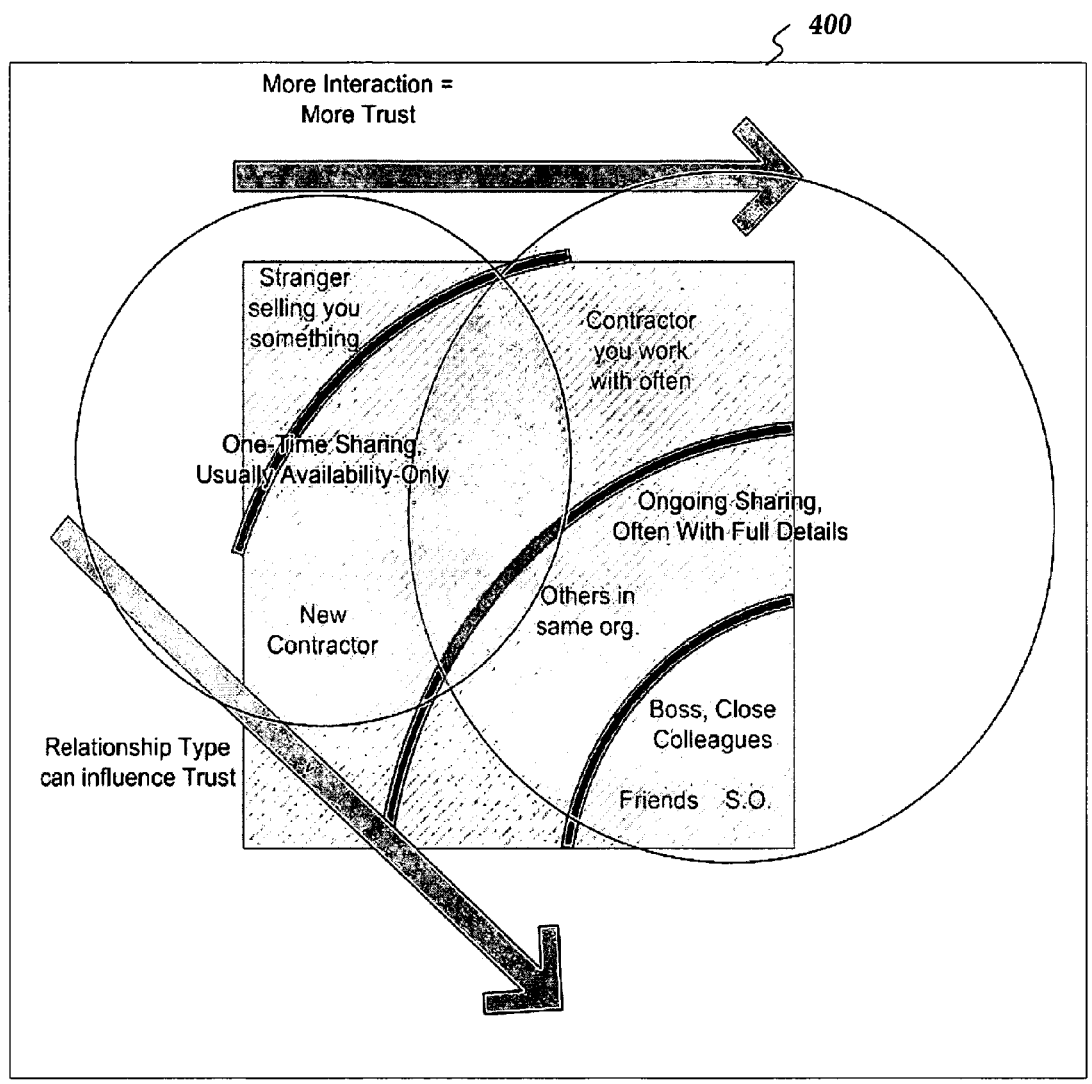
FIG. 4 is a diagram illustrating relationships and interaction leading to trust consistent with an embodiment of the present invention.

At this point, because the master calendar data may include personal and/or secured information, the user may evaluate the user's relationship with a receipt to whom the user wishes to send the calendar data. During this evaluation, the user's trust, comfort, or familiarity with the recipient may be considered. FIG. 4 is a diagram illustrating relationships and interactions leading to trust that the user may consider consistent with an embodiment of the present invention. Based on this evaluation, the user may provide corresponding control data to computing device 100 through a UI.

From stage 210, where computing device 100 receives the control data, exemplary method 200 may advance to stage 220 where computing device 100 may filter the master calendar data based on the control data to create filtered calendar data. For example, the control data provided by the user through the UI may indicate one or more dimensions by which the master calendar may be filtered. A first dimension may be for the user to select a calendar from a plurality of calendars to transmit. Most calendar application programs handle multiple calendars, not just a single calendar. Accordingly, the user may choose one calendar from a plurality of calendars to use. For example, the user may be maintaining a family calendar, a work calendar, and a Little League calendar on computing device 100. The user, for example, may select all or a portion of the Little League calendar to share with other team members (e.g. recipients).

A second control data dimension may be selecting on a date range. For example, the user may provide a date range or ranges on a particular calendar to determine how much calendar data to transmit. The user may provide computing device 100 a range corresponding to, for example, today, tomorrow, the next seven days, the next 30 days, or the whole calendar. In addition, the user may supply a range corresponding to a non-typical range, for example, next Tuesday the $28^{th}$ through the $31^{st}$. In addition, computing device 100 may allow the user to provide control data to limit transmitting calendar data outside the user's defined working hours. For example, if the user wanted to send calendar data to a consultant to set a meeting in the next seven days, the user may elect to just send calendar data within the user's defined working hours.

A third control data dimension may be for the user to limit the detail level included in the filtered calendar to be transmitted. The user, for example, may evaluate the user's relationship with the prospective recipient according to FIG. 4 as described above. Accordingly, the third control data dimension may include one of a plurality of user selectable detail levels, for example, availability only level 305, limited details level 310, and full details level 315, as described above with respect to FIG. 3. A first detail level (e.g. availability only level 305) may comprise availability only. In other words, the first detail level may indicate whether the user, for example, is free or busy, tentative, or out of the office for a particular time span with no other details provided. A second detail level (e.g. limited details level 310) may include providing subjects of individual calendar items on the user's calendar, but may include no further details of the individual calendar items. Moreover, a third detail level (e.g. full details level 315) may include everything in the user's calendar item, including, for example, location, text, body text, attendee list, attachments, and so forth. The aforementioned are exemplary and the third control data dimensions may comprise other user selectable detail levels.

Once computing device 100 filters the master calendar data based on the control data in stage 220, exemplary method 200 may continue to stage 230 where computing device 100 may transmit the filtered calendar data. For example, computing device 100 may transmit the filtered calendar data to the recipient who may be using one of other computing devices 118. The filtered calendar data may be transmitted in a plurality of formats including a first format and in a second format. The first format may comprise iCalendar and the second format may comprise HTML as described above. By transmitting in at least two formats, the user can increase the probability that the recipient will be able to use the transmitted calendar data. Furthermore, one of the transmitted formats may be a more robust format usable by a smaller number of recipients and the other format may be a less robust format readable by a larger number of recipients.

Furthermore, embodiments of the present invention may include supporting calendar by an endpoint (e.g. a recipient computer, other computing devices 118, etc.) capability of such support. In other words, embodiments of the present invention may enable, for example, the recipient to process the calendar data without support from a server. For example, the transmitted filtered calendar data may be configured to be directly usable by a client application. Because the filtered calendar data may be transmitted as an e-mail attachment (e.g. using SMTP) most internet users may participate in the process. For example, embodiments of the present invention may use true peer-to-peer (e.g. over e-mail) calendar sharing, meaning that anyone with a capable client application can use the received calendar data. For example, an iCalendar/HTML calendar "snapshot" via e-mail may be used to share calendar data consistent with embodiments of the invention. Accordingly, calendaring applications consistent with embodiments of the present invention may not need a server to host shared or distributed calendar data. After computing device 100 transmits the filtered calendar data in stage 230, exemplary method 200 may then end at stage 240.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The present invention may be embodied as systems, methods, and/or computer program products. Accordingly, the present invention may be embodied in hardware and/or in software (including firmware, resident software, micro-code, etc.). Furthermore, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention are described above with reference to block diagrams and/or operational illustrations of methods, systems, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

While certain features and embodiments of the invention have been described, other embodiments of the invention may exist. Furthermore, although embodiments of the present invention have been described as being associated with data stored in memory and other storage mediums, aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for providing electronic distribution of secure calendar data, the method comprising:
    receiving, at a second computing device, a first request from a first user at a first computing device for secure calendar data derived from a master calendar controlled by a calendar owner;
    receiving, at the second computing device, a second request from a second user at a third computing device for secure calendar data derived from the master calendar controlled by the calendar owner;
    in response to the first and second requests, receiving control data, the control data configured to indicate first allowed detail level associated with the first user and a second allowed detail level associated with the second user, wherein the allowed detail level indicates a depth of calendar appointment data selected by the calendar owner from a plurality of pre-defined detail levels based on the identity of the user, wherein the plurality of pre-defined detail levels comprises:
        an availability only level providing first calendar information regarding whether the calendar owner is busy for a particular time span, wherein the availability only level also provides subjects of one or more calendar items for the calendar owner; and
        a full details level providing second calendar information that includes greater detail than the first calendar information, wherein the full details level also provides full details of the one or more calendar items for the calendar owner;
    filtering the secure information in the master calendar data based on the control data to create a first filtered calendar data for the first user and a second filtered calendar for the second user;
    generating a representation of the first filtered calendar data for the first user, wherein the allowed detail level of the first user is the availability only level; and
    generating a representation of the second filtered calendar data for the second user, wherein the allowed detail level of the second user is the full details level;
    transmitting the representation of the first filtered calendar data to the first user at the first computing device, wherein the representation of the first filtered calendar only shows when the calendar owner is busy; and
    transmitting the representation of the second filtered calendar to the second user at the third computing device, wherein the representation of the second filtered calendar shows all details for the calendar owner.

2. The method of claim 1, wherein the control data further indicates the first filtered calendar data is within a first calendar selected from a plurality of calendars.

3. The method of claim 1, wherein the control data further indicates the first filtered calendar data is within a time period.

4. The method of claim 1, wherein the control data further indicates the first filtered calendar data is within a time period that corresponds to the first user's working hours.

5. The method of claim 1, wherein transmitting the first filtered calendar data comprises transmitting the first filtered calendar data in a first format and in a second format.

6. The method of claim 1, wherein transmitting the first filtered calendar data comprises transmitting the first filtered calendar data configured to be directly usable by a client application.

7. A computer storage medium not consisting of a propagated data signal which stores a set of instructions which when executed performs a method for providing electronic distribution of filtered calendars, the method executed by the set of instructions comprising:
    receiving, at a second computing device, a first request from a first user at a first computing device for secure calendar data derived from a master calendar controlled by a calendar owner;
    receiving, at the second computing device, a second request from a second user at a third computing device for secure calendar data derived from the master calendar controlled by the calendar owner;
    in response to the first and second requests, receiving control data, the control data configured to indicate first allowed detail level associated with the first user and a second allowed detail level associated with the second user, wherein the allowed detail level indicates a depth of calendar appointment data selected by the calendar owner from a plurality of pre-defined detail levels based on the identity of the user, wherein the plurality of pre-defined detail levels comprises:
        an availability only level providing first calendar information regarding whether the calendar owner is busy for a particular time span, wherein the availability only level also provides subjects of one or more calendar items for the calendar owner; and
        a full details level providing second calendar information that includes greater detail than the first calendar information, wherein the full details level also provides full details of the one or more calendar items for the calendar owner;
    filtering the secure information in the master calendar data based on the control data to create a first filtered calendar data for the first user and a second filtered calendar for the second user;
    generating a representation of the first filtered calendar data for the first user, wherein the allowed detail level of the first user is the availability only level; and
    generating a representation of the second filtered calendar data for the second user, wherein the allowed detail level of the second user is the full details level;
    transmitting the representation of the first filtered calendar data to the first user at the first computing device, wherein the representation of the first filtered calendar only shows when the calendar owner is busy; and
    transmitting the representation of the second filtered calendar to the second user at the third computing device, wherein the representation of the second filtered calendar shows all details for the calendar owner.

8. The computer storage medium of claim 7, wherein the control data further indicates a first calendar selected from a plurality of calendars.

9. The computer storage medium of claim 7, wherein the control data further indicates a time period.

10. The computer storage medium of claim 7, wherein the control data further indicates a time period that corresponds to a user's working hours.

11. The computer storage medium of claim 7, wherein transmitting the first filtered calendar data comprises transmitting the first filtered calendar data in a first format and in a second format.

12. The computer storage medium of claim 7, wherein transmitting the first filtered calendar data comprises transmitting the first filtered calendar data configured to be directly usable by a client application.

\* \* \* \* \*